United States Patent
Johnson et al.

(10) Patent No.: US 9,794,225 B2
(45) Date of Patent: Oct. 17, 2017

(54) SECURE NETWORK COMMUNICATIONS IN A MOBILE DEVICE OVER IPSEC

(71) Applicants: Robert A Johnson, Malvern, PA (US); James Trocki, Malvern, PA (US); Mark K Vallevand, Malvern, PA (US); Steven L Rajcan, Malvern, PA (US); Ted Hinaman, Malvern, PA (US)

(72) Inventors: Robert A Johnson, Malvern, PA (US); James Trocki, Malvern, PA (US); Mark K Vallevand, Malvern, PA (US); Steven L Rajcan, Malvern, PA (US); Ted Hinaman, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 137 days.

(21) Appl. No.: 14/753,146

(22) Filed: Jun. 29, 2015

(65) Prior Publication Data

US 2015/0382193 A1    Dec. 31, 2015

Related U.S. Application Data

(60) Provisional application No. 62/018,956, filed on Jun. 30, 2014.

(51) Int. Cl.
*H04L 29/06* (2006.01)
*H04W 88/16* (2009.01)

(52) U.S. Cl.
CPC .......... *H04L 63/0272* (2013.01); *H04L 63/08* (2013.01); *H04L 63/104* (2013.01); *H04W 88/16* (2013.01)

(58) Field of Classification Search
CPC ... H04L 63/0272; H04L 63/08; H04L 63/164; H04L 63/104; H04W 8/16
(Continued)

(56) References Cited

U.S. PATENT DOCUMENTS

2006/0072505 A1* 4/2006 Carrillo ................. H04L 41/042
370/331
2007/0038853 A1* 2/2007 Day .................... H04L 63/0281
713/153

(Continued)

OTHER PUBLICATIONS

Phillips, C., et al. "Managing dynamic automated communities with MPLS-based VPNs." BT technology journal 24.2 (2006): 79-84.*
(Continued)

*Primary Examiner* — Syed Zaidi
(74) *Attorney, Agent, or Firm* — Robert P. Marley; Richard J. Gregson

(57) ABSTRACT

Methods and systems of communicating with secure endpoints included within a secured network from a mobile device external to the secured network is disclosed. The method includes initiating a VPN-based secure connection to a VPN appliance, and initializing a stealth-based service on the mobile device. The method further includes transmitting user credential information from the mobile device to a VDR broker via the VPN appliance, and receiving status information from the VDR broker identifying a VDR associated with the mobile device and providing a connected status. The method also includes communicating with one or more secure endpoints within the secured network via a VPN connection to the VDR via the VPN appliance and through the VDR to the one or more secure endpoints within a community of interest based on the user credential information transmitted to the VDR broker.

14 Claims, 15 Drawing Sheets

(58) Field of Classification Search
USPC .......................................................... 726/15
See application file for complete search history.

(56) References Cited

U.S. PATENT DOCUMENTS

| | | | | |
|---|---|---|---|---|
| 2012/0124129 | A1* | 5/2012 | Klimentiev | G06F 9/546 709/203 |
| 2012/0290702 | A1* | 11/2012 | Vincent | G06F 9/45558 709/223 |
| 2015/0020164 | A1* | 1/2015 | Tankov | H04L 63/08 726/4 |

OTHER PUBLICATIONS

Patton, Samuel, et al. "A layered framework strategy for deploying high assurance VPNs." High Assurance Systems Engineering, 2000, Fifth IEEE International Symposim on. HASE 2000. IEEE, 2000.*

* cited by examiner

SECURE NETWORK COMMUNICATIONS IN A MOBILE DEVICE OVER IPSEC

CROSS-REFERENCE TO RELATED APPLICATIONS

The present application claims priority from U.S. Provisional Patent Application No. 62/018,956, filed on Jun. 30, 2014, the disclosure of which is hereby incorporated by reference in its entirety.

The present application is also related to, and claims priority from the following related and commonly assigned U.S. Patent Applications:

1. U.S. Provisional Patent Application entitled: Distributed Security on Multiple Independent Networks using Secure "Parsing" Technology, by Robert Johnson, Ser. No. 60/648,531, filed 31 Jan. 2005;

2. U.S. patent application entitled: integrated Multi-Level Security System, by Robert Johnson, Ser. No. 11/339,974 filed 26 Jan. 2006 claiming the benefit of the above provisional applications;

3. U.S. patent application entitled: Integrated Multi-Level Security System, by Robert Johnson et al., Ser. No. 11/714,590 filed 6 Mar. 2007 which is a continuation-in-part of U.S. application Ser. No. 11/339,974;

4. U.S. patent application entitled: Integrated Multi-Level Security System, by Robert Johnson et al., Ser. No. 11/714,666 filed 6 Mar. 2007 which is a continuation-in-part of U.S. application Ser. No. 11/339,974; and 5. U.S. patent application entitled: Integrated Multi-Level Security System, by Robert Johnson et al., Ser. No. 11/714,598 filed 6 Mar. 2007 which is a continuation-in-part of U.S. application Ser. No. 11/339,974.

6. U.S. patent application Ser. No. 12/272,012, entitled "Block Level Data Storage Security System", filed 17 Nov. 2008, The present disclosure also claims the benefit of commonly assigned U.S. patent application Ser. No. 12/336,558, entitled "Data Recovery Using Error Strip Identifiers" filed 17 Dec. 2008.

7. U.S. patent application Ser. No. 12/336,559 entitled "Storage Security Using Cryptographic Splitting", filed 17 Dec. 2008; U.S. patent application Ser. No. 12/336,562, entitled "Storage Security Using Cryptographic Splitting", filed 17 Dec. 2008; U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic Splitting", filed 17 Dec. 2008.

8. U.S. patent application Ser. No. 12/342,636 entitled "Storage Communities Of Interest Using Cryptographic Splitting", filed 23 Dec. 2008, U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008.

9. U.S. patent application Ser. No. 12/342,379, entitled "Secure Network Attached Storage Device Using Cryptographic Splitting", filed 23 Dec. 2008.

10. U.S. patent application Ser. No. 13/493,023, entitled "Software Handling Of Hardware Error Handling In Hypervisor-Based Systems", filed 5 Sep. 2012.

11. U.S. patent application Ser. No. 13/547,148, entitled "Automated Provisioning of Virtual Machines", filed 12 Jul. 2012.

12. U.S. patent application Ser. No. 14/042,239, entitled "Negotiation of Security Protocols and Protocol Attributes in Secure Communications Environment", filed 30 Sep. 2013.

13. U.S. patent application Ser. No. 14/042,182, entitled "Secured Communications Arrangement Applying Internet Protocol Security", filed 30 Sep. 2013.

The disclosures of each of these applications are hereby incorporated by reference in its entirety as if set forth in this application.

TECHNICAL FIELD

The present application relates generally to secured communications and storage systems, and in particular to secure network communications in a mobile device over IPSec.

BACKGROUND

Modern organizations generate store, and communicate large quantities of data. In many instances, organizations include individuals having different rights to data, or different rights to communicate with other individuals or access particular computing resources. It is frequently important that such organizations be able to quickly and securely access the data stored at the data storage system. In addition, it is frequently important that data stored at a data storage system, or communicated between computing systems, be recoverable if the data is communicated or written incorrectly or are otherwise intercepted or corrupted.

To address the above issues, Unisys Corporation of Blue Bell, Pa. developed a Stealth solution that uses a kernel-level driver to implement end-to-end cryptographic connections for communication of data across public and private networks. This solution allows users to communicate with other users having common user rights, while segregating user groups by way of assignment of different cryptographic keys used for each user group, or "community of interest". However, the Stealth solution has some drawbacks.

Internet Protocol Security (IPsec) is one such standards-based protocol suite used for securing Internet Protocol (IP) communications by authenticating and encrypting each IP packet of a communication session. IPsec includes protocols for establishing authentication between agents at the beginning of the session and negotiation of cryptographic keys to be used during the session. IPsec is an end-to-end security scheme of the Internet Protocol Suite. As compared to other security systems, such as SSL, SSH, or TLS, IPsec operates in the Internet Layer rather than operating in the upper layers of the TCP/IP model. Hence, IPsec protects any application traffic across an Internet Protocol (IP) network. Applications do not need to be specifically designed to use IPsec, whereas TLS/SSL is required to be designed into an application to protect the application protocols. In addition, IPsec operates in both IPv4 and IPv6-enabled networks.

However, IPsec is not without drawbacks Existing IPsec-enabled systems typically negotiate to create IPsec tunnels, or secure tunnels, on a point-to-point basis, rather than allowing for data access by multiple entities within the same "community of interest". Furthermore, IPsec is only available on some modern computing systems, and may be limited in availability in different types of systems, such as mobile devices. Furthermore, different implementations of IPsec on different types of computing systems are handled differently, leading to inconsistencies in connection parameters. Additionally, IPsec is built based on a premise that two computing systems can negotiate security parameters; when two such systems intend to form a secure tunnel, that tunnel is established through use of an IKE key exchange, which requires a response to an initial transmission. However, to accomplish perfect forward secrecy, such trading of security parameters may not be possible.

Still further issues arise in the context of mobile devices, which may be located external to the secure network to which such mobile devices wish to connect. Such devices may use operating systems that lack support for Stealth, and may lack support for IPsec entirely. Furthermore, because such devices are mobile, there is no reliable instance in which the device may have a dedicated secured connection either to or within a network. Accordingly, improvements in the various existing secured communications systems are desired.

SUMMARY

In a first aspect, a method of communicating with secure endpoints included within a secured network from a mobile device external to the secured network is disclosed. The method includes initiating a VPN-based secure connection to a VPN appliance, and initializing a stealth-based service on the mobile device. The method further includes transmitting user credential information from the mobile device to a VDR broker via the VPN appliance, and receiving status information from the VDR broker identifying a VDR associated with the mobile device and providing a connected status. The method also includes communicating with one or more secure endpoints within the secured network via a. VPN connection to the VDR via the VPN appliance and through the VDR to the one or more secure endpoints within a community of interest based on the user credential information transmitted to the VDR broker.

In a second aspect, a method of enabling communication between a mobile device and one or more secure endpoints included within a secured network is disclosed. The method includes receiving user credentials from a mobile device at a VDR broker within a gateway, and allocating a VDR at the gateway. The method also includes retrieving a wrapping key associated with the VDR, and transmitting a tuples request to an authentication server from the VDR broker, the tuples request including the user credentials. The method further includes receiving from the authentication server COIs wrapped with the wrapping key associated with the VDR, the COIs based on the user credentials, and providing configuration information to the VDR.

In a third aspect, a system for enabling communication between a mobile device and one or more secure endpoints included within a secured network is disclosed. The system includes a mobile gateway communicatively connectable to a mobile device via a tunneled connection. The mobile gateway includes a VDR broker configured to allocate VDRs to mobile devices based on authentication credentials received from the mobile devices and obtain key information to provide to the allocated VDRs for use in secure communications within the secured network. The mobile gateway further includes one or more VDRs associated with the mobile device and providing proxied secure communications using the key information obtained from the authentication server based on the authentication credentials provided by the mobile device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1A:
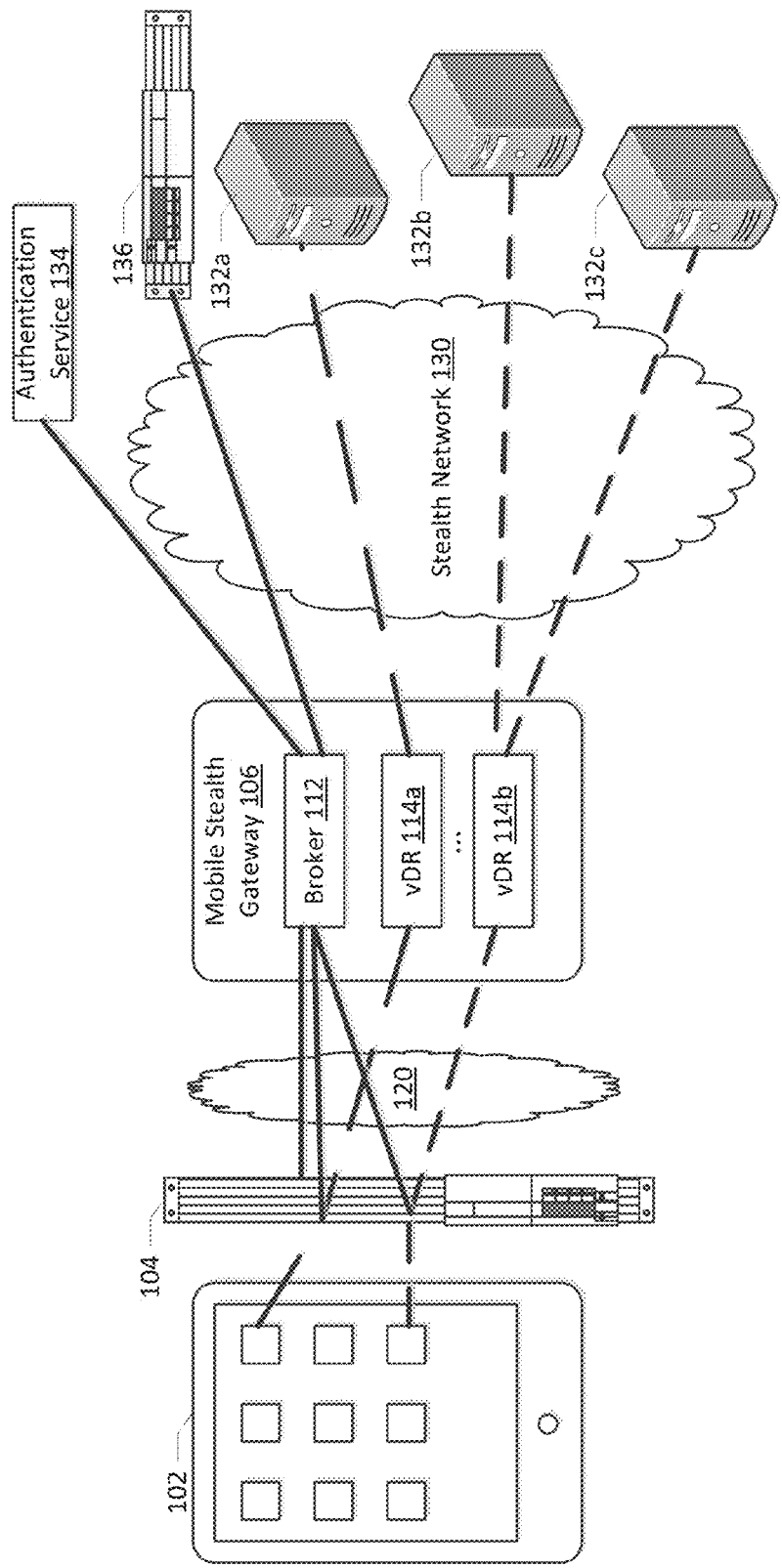
FIG. 1A illustrates a generalized network in which communication is enabled between a mobile device and one or more secure endpoints included within a secured network.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to improvements to systems and methods for securing endpoints and communication channels, such as the Stealth secure communications and storage system of Unisys Corporation of Blue Bell, Pa. As is included in the existing Stealth system, data to be transmitted among endpoints (e.g., client or server computing systems) is encrypted such that (1) no computing system other than the sender and intended recipient can view the contents of the encrypted message(s), and (2) in some embodiments, the messages are configurable such that message packets themselves are split among different packets and optionally transmitted along different transmission paths between computing systems, to ensure receipt of the secured communications at a receiving endpoint. That receiving endpoint can then reconstruct the message based on one or more such received split and encrypted messages.

The present disclosure specifically describes aspects of secure communications and secure computing systems that provide for a flexible manner in which mobile devices external to a secured network, such as a network secured with Stealth technology, can remotely connect to and securely communicate with endpoints within that secured network. Furthermore, the present application describes methods and systems by which specific devices, users, or applications themselves may be specifically associated with a group of affiliated computing resources such that only those resources within the secured network are visible to that associated device, user, or application. Other endpoints or computing resources within the secured network remain present, but are entirely opaque to the mobile device if not within the same community of interest. Accordingly, even specifically-addressed messages directed to such endpoints will not be responded to (even with a response denying connection) thereby avoiding potential security issues that may be caused by denial of service attacks or other potential security compromise situations that do not require establishment of a connection to interfere with network operations. Accordingly, the present disclosure provides an additional layer of security in addition to traditional VPN connectivity, which is traditionally controlled or secured only at the level of user/device.

Referring now to FIG. 1A, a generalized network 100 in which communication is enabled between a mobile device and one or more secure endpoints included within a secured network is shown. The network 100 includes a mobile device 102 communicatively connected, via a public network 110, to a VPN server 104 managed by a secured entity. The VPN server 104 allows for communication via a trusted subnet 120 to a mobile gateway 106.

The mobile device 102 generally corresponds to any type of mobile device, such as a mobile phone, tablet, laptop, or other type of mobile device which may be used to connect to a secured network from a variable location and/or subnetwork. In the case of mobile phone and tablet devices, such a device may be an iOS-based device provided by Apple Corporation of Cupertino, Calif. or an Android-based device provided by any of a number of equipment-manufacturers, and operating using a variant of the Android operating system provided by Google, Inc. of Mountain View, Calif. Other types of mobile operating systems could be used as well (e.g., Blackberry, Microsoft's Windows Phone OS, or other operating systems). In preferred embodiments, the mobile device 102 either has a native IPsec implementation allowing it to communicate with a VPN server via an IPsec-based connection, or is capable of having installed thereon an application that manages such a secured connection over a public network. Consequently, the VPN server 104 provides a location at which the mobile device 102 can establish a secure connection to the enterprise, and which relays messages to the mobile gateway which effectively proxies the mobile device within the secure network, as discussed in further detail below.

In example embodiments, the VPN server 104 connects to an external network which is also accessible by the mobile device 102. The VPN server 104 authenticates and establishes an IPsec tunnel between itself and the mobile device 102, assigning it an IP address and subsequently routing traffic to the trusted subnet 120.

The mobile gateway 106 generally receives messages from the VPN server 104, relayed from the mobile device 102, via a portion of the enterprise network shown as a trusted subnet 120, which is dedicated to secure message routing between one or more VPN servers 104 and mobile gateways 106. The trusted subnet 120 may pass messages in cleartext or encrypted form, but in a manner dedicated to such interface communications with devices located remotely from the enterprise. In example embodiments, the trusted subnet may be a physical network connecting devices or a virtual network connecting software within an OS instance or a combination of the two. In all cases the trusted subnet 120 is isolated from the outside network and the Stealth network 130. Accordingly, if so desired, the trusted subnet 120 can be clear-text and would support packet inspection, firewalling and similar features if desired.

The mobile gateway 106 is communicatively connected to a Stealth network 130. The Stealth network 130 generally corresponds to a network managed within an enterprise, and which includes a plurality of Stealth network endpoints 132a-c, an authentication server 134, and a licensing server 136. The Stealth network 130 generally implements Stealth-based communications among endpoints within the Stealth network 130, as discussed in the applications incorporated by reference above. In example embodiments, the Stealth network 130 can be implemented using one or both of an IPsec-based Stealth implementation and a multi-level secure tunneling protocol (MLSTP)-based Stealth implementation, as is also described in the applications incorporated by reference above.

In the embodiment shown, the mobile gateway 106 includes a VDR broker 112 and a plurality of VDRs 114a-b. The VDR broker 112 interacts with the VPN server 104 and an authentication server 134, and the resources which instantiate instances of a virtual data relay (VDR), to establish routing of traffic to effectively allow a mobile device to participate in the Stealth network 130.

The VDR broker 112 acquires a Stealth license; during the authentication and authorization process of each mobile endpoint, the authorization manager of the VDR broker 112 will identify itself to the authentication server 134 as a VDR broker 112 for a mobile device in an XML-based tuples request (discussed in further detail below), and identifies the authenticating user via HTTP. The authentication server 134 will then indicate to the VDR broker 112 that a Stealth Mobile license is available for use.

In general, to ensure security the VDR broker 112 will not service client connections from mobile devices without first securing appropriate licenses, from the authentication server 134 and/or licensing server 136.

The VDRs 114a-b operate as proxies for the mobile devices 102 with which they are associated. Generally, an instance of a VDR exists for each IPsec connection established by the VPN server 104. For example, if a secure connection is established on a per-device basis, each device will be associated with a different VDR 114. In the example shown, different applications on the mobile device 102 are each associated with different VPN-based connectivity, and have different security credentials. Accordingly, in such an example embodiment, different VDRs (shown as VDRs 114a-b) are associated with different applications on the same mobile device 102. Generally, each VDR 114 hosts a Stealth network endpoint. The endpoint has been authenticated by the authentication server 134. Traffic routes are established allowing traffic to flow between a stealth network endpoint 132 and the mobile device 102, based on the stealth network endpoint and the associated application (or device, or user, based on the level of granularity of security authorization as implemented). In particular embodiments, application-level authentication is used to the exclusion of device-level authentication, requiring a user to authenticate himself herself within each application seeking a secured connection to Stealth network endpoints 132.

In example embodiments, and as discussed further below, the IPsec-based Stealth solution can be employed in either an entirely IPsec-based secure network, or within an existing Stealth network employing a traditional bit-based splitting and encrypting/dercrypting arrangement, which utilizes an existing multi-level secure transport protocol (MLSTP) secure communications construct, in both configurations, all endpoints in the Stealth network are required to be licensed with a Stealth license that supports earlier versions of the Stealth security protocol. In addition, a Stealth appliance may be used, and all licensing and logging is provided through the Stealth appliance (or team of appliances). However, it is noted that a mixed Stealth configuration may be required when the IPsec-based system is deployed in an existing Stealth network in which endpoints are already running a previous Stealth configuration, or when the existing (or new) Stealth network must support otherwise unsupported endpoints (e.g., Windows XP, Windows 2003).

The VPN server 104 will perform the IPsec authentication and tunnel address assignment with participation by the VDR broker 112. Accordingly, mobile device applications will connect to the VPN server 104 using a user ID for an IPsec authentication, which will also subsequently used for Stealth authentication via the authentication server 134.

Although in the embodiment shown a single mobile device is illustrated, it is understood that this is intended as exemplary; however, in typical embodiments the mobile broker will manage connections associated with a plurality of different mobile devices, mobile device applications, and/or users.

Figure 1B:
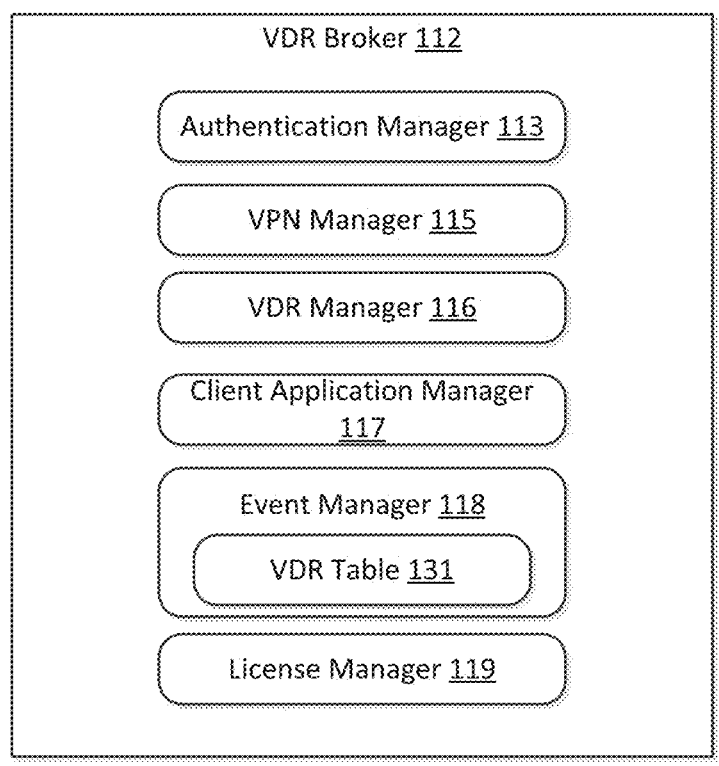
FIG. 1B illustrates components of a VDR broker included in the mobile gateway illustrated in FIG. 1A, and useable to establish a virtual data relay (VDR) useable to enable communication between a mobile device and one or more secure endpoints included within a secured network.

Referring now to FIG. 1B, details of the VDR broker 112 included within the mobile gateway 106 are provided, according to an example embodiment. In example implementations the VDR broker 112 operates on an enterprise Linux-based system, with each of a plurality of managers instantiated thereon executing as separate programs in separate processes. In example implementations, the VDR broker 112 can be deployed as a bootable image that can be deployed on a bare metal computing system or virtual machine guest on a computing device, such as the devices illustrated in FIGS. 11-13, below. Various messages handled by the VDR broker 112, and in particular the managers included therein, can be implemented using named pipes, with messages represented in structures that are decodable to function parameters that can be consumed by the event managers. In the example shown, the VDR broker 112 includes an authentication manager 113, a VPN manager 115, a VDR manager 116, a client application manager 117, an event manager 118, and a license manager 119.

The authentication manager 113 operates to, in example embodiments, authenticate VPN user and client application credentials with the Stealth-enabled network, for example by connecting to the authentication server 134. The authentication manager 113 can do so, for example in response to a request generated by the event manager 118. The authentication manager can further obtain Stealth authentication and authorization key materials, and return them to the event manager 118. Additionally, to the extent various versions of the Stealth service are provided within the Stealth network 130, the authentication manager 113 is configured to abstract such communication systems into a single, unified view presented to the mobile device 102, in some embodiments, an API library can be used to connect to the authentication server 134 to authenticate user/application credentials.

The VPN manager 115, in the embodiment shown, is configured to receive client tunnel connection indications from the VPN server 104, and reports the information to the event manager 118. The VPN manager is configured to receive client tunnel disconnection indications from the VPN server 104 and reports them to the event manager 118 as well. The VPN manager 115 is also configured to close a client tunnel in the VPN concentrator upon request from the event manager 118, and manages different types of VPN and abstracts them into a single view for management purposes. In example embodiments, an SSU-based library can be used by the VPN manager 115 to issue command line operations to the VPN server 104, to explicitly issue connection closures to mobile devices connected via such a VPN server.

The VDR manager 116, in the embodiment shown, is configured to start and shut down VDRs 114, as well as handling requests from the broker. The VDR manager 116 is further configured to create new VDR 114 and return its IP addresses. The VDR manager 116 is also configured to delete old VDRs, and manage an available VDR pool, to the extent a maximum number or available number of VDRs is provided at the mobile gateway 106. In example embodiments, to manage a pool of available VDRs, the VDR manager 116 creates and/or stalls new VDRs 114 when needed and assigns IP addresses and other configuration parameters to those VDRs. The VDR manager also manages different versions of VDRs, for example based on types of connectivity, and abstracts them into a single view.

In example embodiments, the VDR manager 116 is instantiated using a shell script within the VDR broker 112, and initiates a container having a configuration file. The VDR manager 116 can be initialized to instantiate a master VDR as well as one or more internal VDR pools and lists, and initialize individual VDRs for use. The VDR manager 116 can associate IP addresses, hardware addresses, and other physical resources (routing, packet forwarding parameters) to the various VDRs. The VDR manager 116 maintains a set of life-cycle states of VDRs, including a starting state, a running state, a freezing state, a frozen state, an unfreezing state, a stopping state, and an error state. The starting state represents a VDR cloned from a master VDR, which initializes hardware resources and causes the VDR to join a pool as a running VDR. The VDR is then initialized as useable within a stealth network, and enters a freezing state, which places the VDR in the pool of available VDRs (discussed below), in a frozen state. When a VDR is allocated, the VDR manager 116 indicates that the VDR is in an unfreezing state. The stopping state manages client requests to stop a VDR, which corresponds to the termination occurring in FIG. 2 (and tracked by the event manager 118) below. An error state indicates that an uncorrectable error has occurred within the VDR, causing it to be terminated and ceasing to exist (allowing a new VDR to be re-instantiated).

The client application manager 117, in the embodiment shown, is configured to receive Stealth user credentials from a mobile client application, and receives status update requests from such an application. Likewise, the client application manager 117 can be configured to send status update requests to an application on a mobile device, and manage different types of client applications for abstracting to a single view for management purposes as well.

The event manager 118, in the embodiment shown, is configured to manage the state of each client connection. Example states of client connections are described in an example embodiment below, in connection with FIG. 2. The event manager 118 is further configured to receive and act upon events posted by the other modules, as also described below.

The license manager 119, in the embodiment shown, is configured to obtain a fixed count of Stealth Mobile licenses from a Stealth license gateway, and maintain a license tunnel to the license gateway on behalf of each of the VDRs 114 at the mobile gateway 106. The license manager 119 is further configured to report license tunnel and license allocation status to the event manager 118.

In example embodiments, the event manager 118 manages a VDR table 131 that tracks a state of each client connection. The VDR table 131 can include, for example, various user and connectivity parameters, such as a VPN User ID, a VPN assigned IP address, a VPN Session ID, a VDR Session ID, a VDR IP address, a Stealth User ID, a start time, a keep alive (last received) time, a state (e.g., pending, open, close, error), and a list of IDs for communities of interest associated with the particular VDR, defining the endpoints with which that VDR can connect or to which the VDR (and associated mobile device 102) is visible.

In general the VDR broker 112 manages a plurality of events and associated states for each connection to a mobile device application. Events can include, for example, an access request message receipt, a VPN tunnel up or down message, a VDR down event, a Stealth tunnel down event, a Stealth TUN down event, or a license lost event. Such events can be triggered, typically, by external systems transmitting messages to the VDR broker 112. Correspondingly, the VDR broker 112 can take a plurality of different actions relative to such messages received, such as adding a new VDR, deleting an old VDR, performing a status query, generating an administrative notification, retrieving a wrapping key from an active VDR, or sending community of interest (COI) keys to a VDR. Furthermore, the VDR broker 112 manages VDR states for each VDR, as noted below.

Figure 2:
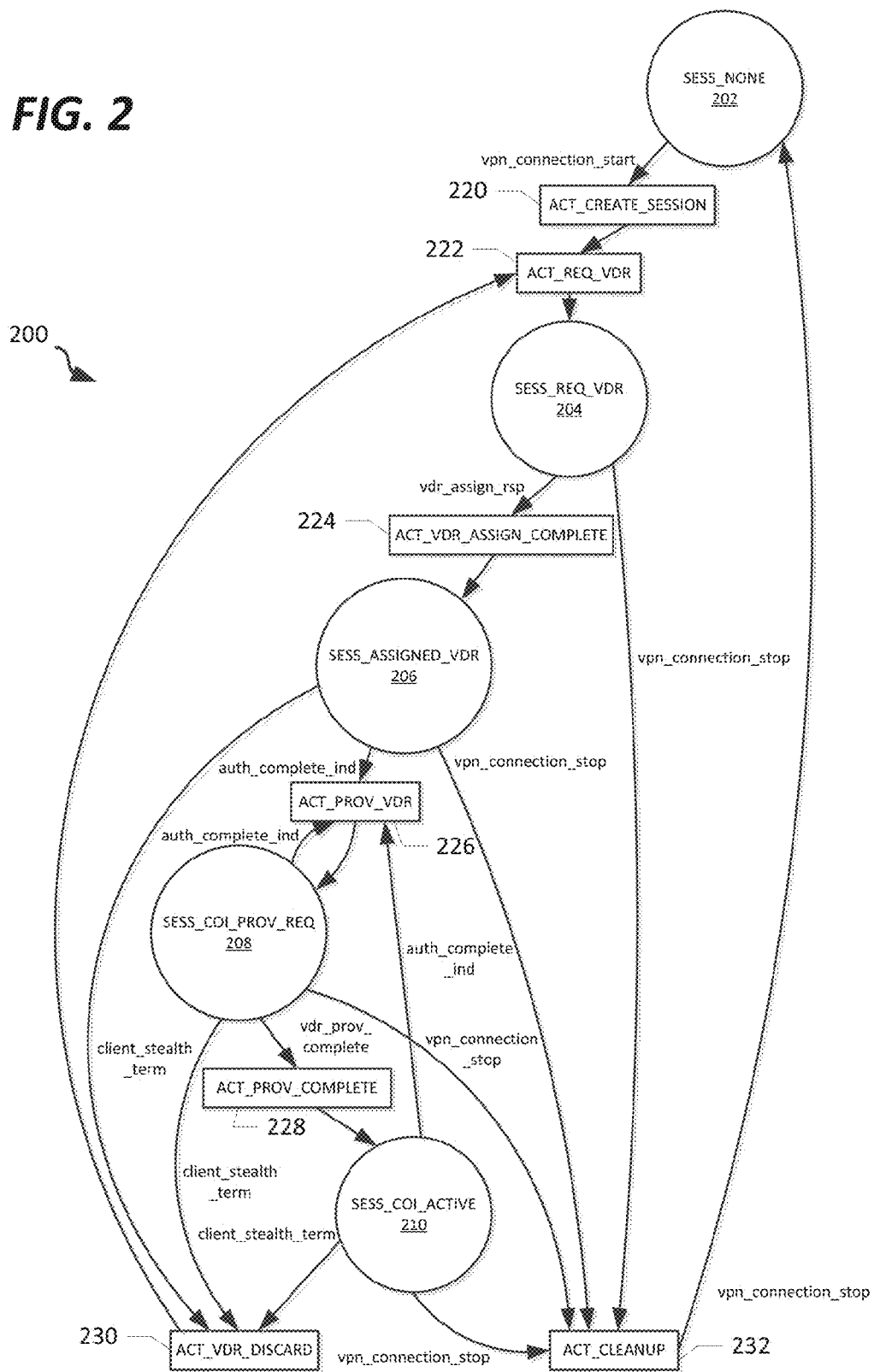
FIG. 2 illustrates a state diagram showing connectivity states of a mobile gateway for a particular enabled network connection between a mobile device and one or more secure endpoints included within a secured network.

Referring now to FIG. 2, a state diagram 200 is illustrated showing connectivity states of a mobile gateway for a particular enabled network connection between a mobile device and one or more secure endpoints included within a secured network. VDR states can include, for example, a null session state 202 (referred to as SESS_NONE), a VDR request state 204 (SESS_REQ_VDR), an assigned VDR state 206 (SESS_ASSIGNED_VDR), VDR provisioning request state 208 (SESS_COI_PROV_REQ), and a VDR active state 210 (SESS_COI_ACTIVE). Generally the null session state 202 represents a VDR in an available pool and lacking any routing or association with a VPN IP address. Such VDRs have a service key loaded and an associated IP address. The VDR request state 204, or starting state, generally has no routing, and is not associated with a VPN IP address. Rather, in this starting state the VDR broker 112 can create or start a container and start a Stealth service key mode, allowing the VDR to be allocated from the available pool.

The assigned VDR state 206 still has no routing, but has a service key loaded and includes IP addresses. The assigned VDR state 206 is associated with a VPN IP address, corresponding that VDR with a particular secure connection to a mobile application. However, a VDR, in the assigned VDR state still has no community of interest material (keys, etc.) assigned, so communication by the mobile device within the Stealth network 130 is not yet enabled. In the VDR active state 210, the VDR broker 112 has assigned the VDR 114 with routing information, an associated VPN IP address, and community of interest material. Furthermore, the VDR broker 112 has opened a license tunnel, allowing for validation of the COI material within the Stealth network 130.

In operation, the event manager 118 of the example embodiments described above tracks state transitions among the various states 202-210, which may transition based on actions taken by the VDR broker 112. Various actions may be performed. In example embodiments, actions can include:

- a session creation action 220 (ACT_CREATE SESSION), which creates a session entry and assigns a session ID;
- a request VDR action 222 (ACT_REQ_VDR), which corresponds to a VDR request received at the VDR manager from a VPN server 104, and including a Client IP address and session ID. The request VDR action 222 triggers a VPN_CONNECTION_START event passing a username and IP address of the mobile endpoint from the VPN server 104 to the VDR broker 112.
- a VDR assignment action 224 (ACT_VDR_ASSIGN_COMPLETE), which reassigns a state to assign the VDR;
- a VDR provisioning action 226 (ACT_PROV_VDR), which sends a provision request to the VDR manager;
- a VDR provisioning verification action 228 (ACT_PROV_COMPLETE), which resets a state of the VDR to active, as noted below; and a VDR discarding action 230 (ACT_VDR_DISCARD), which issues a VDR discard request to the VDR manager; and
- a cleanup action 232 (ACT_CLEANUP), which issues a VDR discard request to the VDR manager and frees session resources for reuse.

Figure 4:
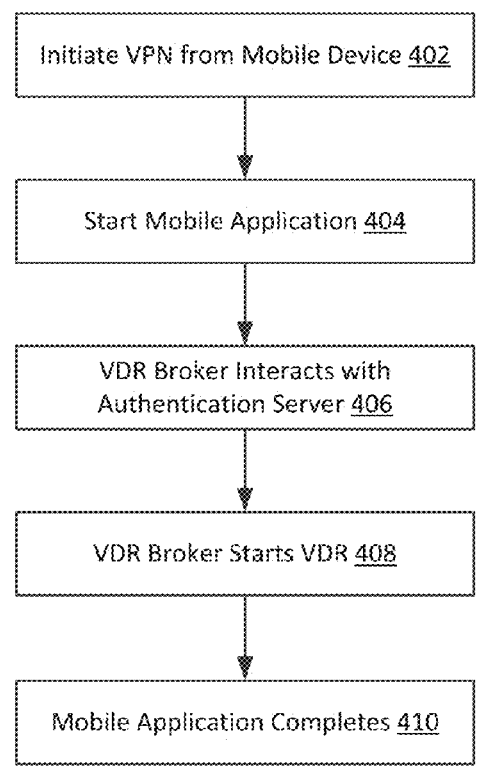
FIG. 4 illustrates a flowchart of a method for enabling communication between a mobile device and one or more secure endpoints included within a secured network.

In the null session state 202, receipt of a start, connection request from a VPN server 104 (shown as VPN_CONNECTION_START) will cause the VDR broker 112 to perform a session creation action 220, transitioning the VDR to the VDR request state 204. Receipt of a vdr assignment response (VDR_ASSIGN_RSP), which indicates that a VDR has been allocated, can trigger the VDR assignment action 224, and, upon a VDR assignment action 224 (ACT_VDR_ASSIGN_COMPLETE), transition to the assigned VDR state 206. The VDR, assignment response can include, for example, a VDR, ID parser public key, and VDR IP addresses (with different IP addresses facing networks 120, 130, as seen in FIG. 4).

An authentication completion indication (AUTH_COMPLETE_IND), corresponding to a message from the authentication manager that a Stealth user has been authenticated by the authentication server 134, includes a username, gateway, and COI response from the authentication server, and triggers the VDR provisioning action 226, which in turn transitions the VDR to a VDR provisioning request state 208. From the VDR provisioning request state 208, a VDR provisioning verification action 228 will transition the VDR to a VDR active state 210, upon occurrence of a verification message (VDR_PROV_COMPLETE) from the VDR manager. From the VDR active state 210, a connection stop message (VPN_CONNECTION_STOP) received from the VPN server 104 indicating that a VPN tunnel has closed will cause transition to return to a VDR provisioning action 226, triggering attempts to re-provision the VDR with the associated mobile device upon reconnection of the VPN tunnel.

Additionally, when in any of states 206-212, performance of a cleanup action 232, or in states 208-212 performance of a VDR discarding action 230, will transition the VDR to a null session state 202, returning the VDR to an available pool by turning off all routing, disabling workgroups, and disassociating a VPN IP address (thereby disassociating the VDR from the mobile device and associated application). Such terminations may occur, for example, in response to a termination message received from the authentication manager (referred to in FIG. 2 as CLIENT_STEALTH_TERM).

Referring to FIG. 2 generally, it is noted that although a particular set of states and state transitions are disclosed, other states or transitions may be provided as well, for example to accommodate tracking of different types of VDR connections, VPN connections, or to further define instances in which terminations occur to determine a cause of such terminations.

Figure 3:
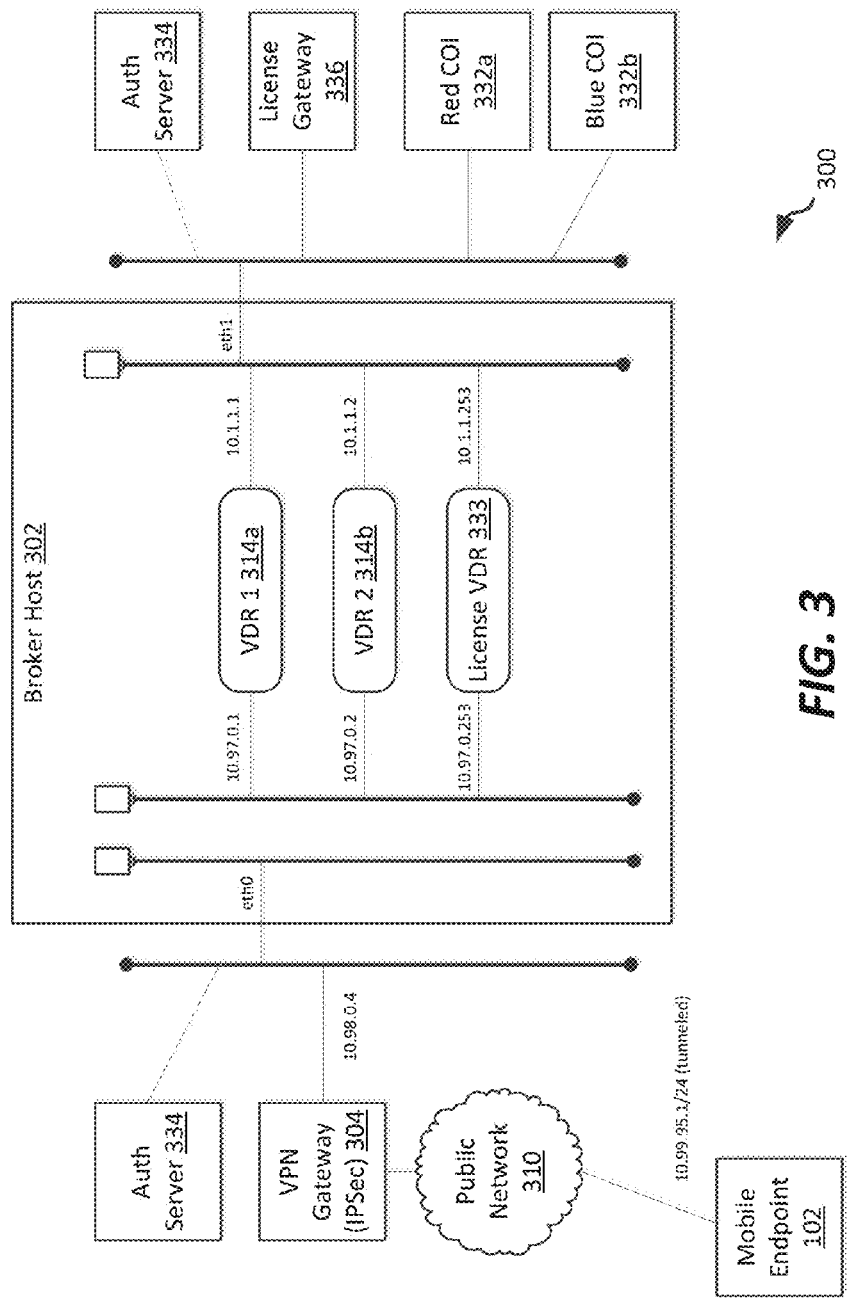
FIG. 3 illustrates an arrangement allowing a mobile device to connect to a plurality of different communities of interest, according to an example embodiment.

Referring now to FIG. 3, a particular arrangement 300 is shown, allowing a mobile device to connect to a plurality of different communities of interest, according to an example embodiment. The arrangement 300 illustrates connectivity within a broker host 302, which generally represents a computing system hosting the VDR broker 112 of FIG. 1.

In the embodiment shown, a mobile device 102 can connect to a VPN gateway 304 (e.g., corresponding to VPN server 104 of FIG. 1) via a public network 310. The connection between the mobile device 102 and VPN gateway 304 can be a tunneled, IPsec-based secure connection. In the embodiment shown, this connection is shown as accessible to the mobile device via address 10.99.95.1/24 (by way of example only). The VPN Gateway communicates with the broker host 302 via a network 320, at which it exposes a second IP address by which it communicates. In the example shown, the VPN gateway 304 is accessible using IP address 10.98.0.4.

Within the broker host 302, a plurality of VDRs are established by the VDR broker (not shown here, but as discussed above). In this example, the mobile device 102 can communicate separately with two different VDRs, given IP addresses 10.97.0.1 and 10.97.0.2. Accordingly, a first application at the mobile device 102 may have a first secure connection to a first VDR 314a (accessing at 10.97.0.1), while a second application at the mobile device 102 may have a second, separate secure connection to a second VDR 314b (accessing at 10.97.0.2). Such different VDRs may be assigned different COI credentials, allowing the first VDR 314a to connect to a first set of endpoints within a first community of interest 312a (shown as "Blue COI"), while a second VDR 314b can connect to a second set of endpoints within a second community of interest 312b (shown as "Red COI").

Additionally, an authentication server 334 can be presented either at network 320 or network 330, and is accessible within the local subnet to pass COI credentials to the VDRs based on a request received from the VDR broker at the broker host 302. A licensing tunnel can be established to a licensing gateway 336 (analogous to licensing server 136) at network 320 or network 330 as well, and can connect to a licensing VDR 333 via an address within subnets facing either network 320 or 330 (subnets 10.97.0.x or 10.1.1.x) at a known address to allow for establishing and monitoring a licensing connection at the broker host 302.

Referring now to FIG. 4 generally, a flowchart of a method 400 for enabling communication between a mobile device and one or more secure endpoints included within a secured network is shown. The method 400 can be performed within a network such as network 100, to initialize and perform communications between a mobile device (e.g., mobile device 102) and an endpoint within a secure network (e.g., Stealth network endpoints 132a-b within an allocated COI). Generally, the method 400 is performed based on selecting an appropriate VPN client and connection that is configured for connection to a VPN server affiliated with a secured network, such as VPN server 104 associated with a Stealth network 130 of FIG. 1.

In the embodiment shown, the method 400 includes initiating a VPN connection from the mobile device (step 402). This can include enabling the VPN client, and prompting a user of the VPN client to connect to the VPN server, for example using a username/password or other authentication credentials. Upon establishment of the VPN connection the mobile device will have a working network path to the VPN server and an associated VDR broker, but cannot yet access a Stealth-based intranet or associated services.

In some embodiments, initiating a VPN connection from the mobile device can include starting a Stealth-specific mobile application (step 404) and initializing a Stealth connection at the mobile device. Such embodiments, which may be required by some operating systems that do not enable IPsec-based connections natively, may require additional connection parameters (e.g., a passphrase or other secure communication credentials) which allow the user to open an SSL connection between the VPN server and the VDR broker. The user can then enter his or her username and password information to allow for a logon connection to the VDR broker.

In the embodiment shown, the method 400 further includes the VDR broker interacting with an authentication server (e.g., authentication server 134 of FIG. 1A, or authentication server 334 of FIG. 3) to pass the user's credentials to the authentication server for authentication (step 406). The VDR broker transmits a tuples request to the authentication server and obtains a public certificate from the authentication server. The authentication manager (e.g., authentication manager 113 of FIG. 1B) creates an event to add a new VDR, and an event to obtain a wrapping key from the VDR. The wrapping key obtained from the VDR is then returned to the authentication server, which (upon positive authentication) returns the response to the tuples request including COI information (including COI keys) wrapped with the VDR's wrapping key.

In the embodiment shown, the method 400 also includes the VDR broker starting the VDR associated with the COI information (step 408). This includes the VDR broker building a stealth configuration based on the returned tuples request results from the authentication server, establishing routing, and awaiting a license tunnel to open. The VDR broker than passes the COI key IDs, appliance IP addresses, key status, and other connection information to the VDR.

The mobile application further includes, in some example embodiments, the mobile application receiving an answering response based on the authentication request transmitted by the mobile device (step 410), indicating to the mobile device the success or failure of establishing a secure connection to the desired Stealth-enabled network (specifically, the assigned COIs within that network).

Figure 5A:
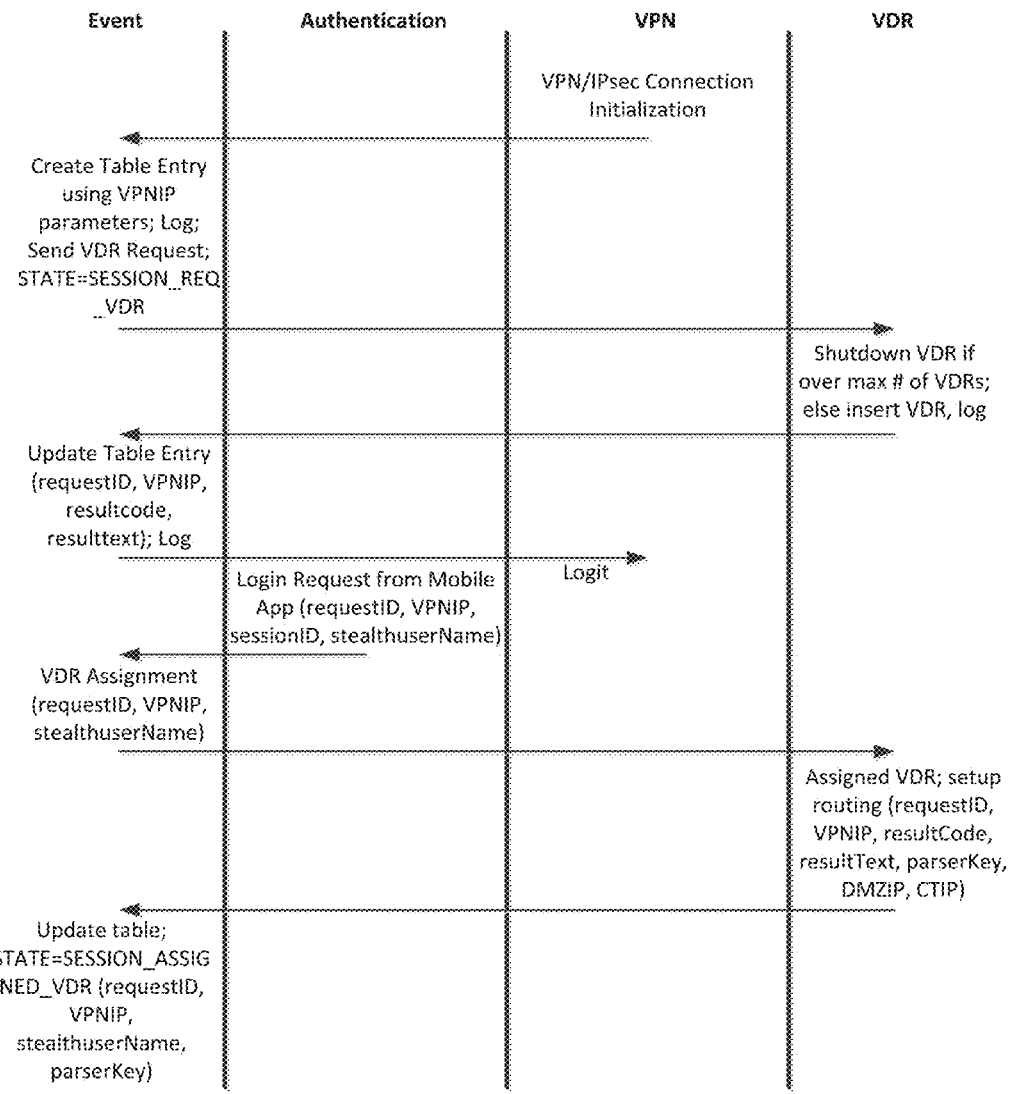
FIGS. 5A-5B illustrate an event sequence occurring at a mobile gateway to establish a VDR used for communication between a mobile device and one or more secure endpoints included within a secured network, according to an example embodiment.
Figure 5B:
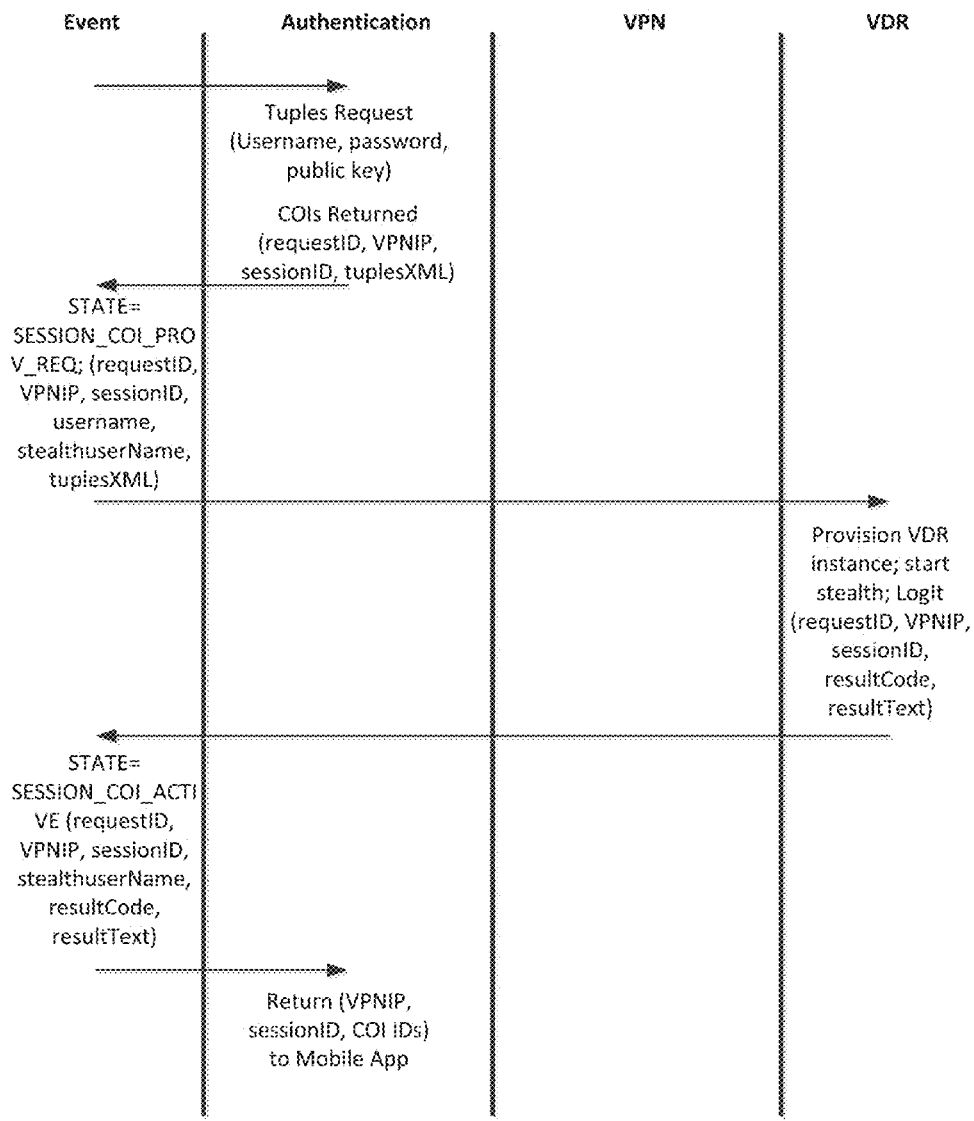

Referring now to FIGS. 5A-5B, 6A-6B, and 7-8, various messaging and events are described illustrating example connection and disconnection sequences occurring between a mobile device and a Stealth-enabled network (by way of a mobile gateway and associated VDR broker). FIGS. 5A-5B illustrate an event sequence 500 occurring at a mobile gateway to establish a VDR used for communication between a mobile device and one or more secure endpoints included within a secured network, according to an example embodiment. In the embodiment shown, operational event sequences occur among an event manager, an authentication manager, a VPN manager, and a VDR manager, examples of which are discussed above in connection with FIG. 1B.

In the example shown, a VPN manager (e.g., VPN manager 115) indicates an initialized VPN connection to a mobile device. The event manager (e.g., event manager 118) creates a table entry using the VPN IP parameters, and logs that event. The event manager then sends a VDR request to the VDR manager, and indicates a state should be set at SESS_REQ_VDR (e.g., VDR request state 204), indicating to request a VDR to be allocated. The event manager passes a message to VDR manager (e.g., VDR manager 116), which shuts down a VDR if a maximum number of VDRs has been reached, or otherwise allocates a new VDR. The event manager receives confirmation of the allocated VDR, and updates a table entry in VDR table 131 with a requestID, VPN IP, resultcode, and result text. The event manager also logs the allocation of the VDR. The event manager returns a message to the VPN manager.

The authentication manager (e.g., authentication manager 113) receives a login request from a mobile application, and event manager transmits a VDR assignment to the VDR manager. The VDR manager assigns a VDR and returns an assigned VDR, routing information, and a wrapping key. The event manager updates a table to indicate a state of the VDR as an assigned VDR state 206 (SESS_ASSIGNED_VDR) and stores a stealth user name, wrapping key, requestID, and VPN IP in the VDR table 131. The event manager then provides to the authentication manager a message, causing the authentication manager to transmit a tuples request to the authentication server (e.g., authentication server 134 or 334 of FIGS. 1A, 3). The topics request can include, for example, a username, password, and public key, and a response to the tuples request can be received that includes the request ID, VPN IP address, sessionID, and a tuples XML file including COI information wrapped with the wrapping key of the VDR. The event manager the updates a state of the VDR (to the VDR provisioning request state 208, SESS_COI_PROV_REQ), and logs the information retrieved. The event manager passes the received information to the VDR manager which provisions the VDR instance with the various information (COI information in the form of the tuples XML file, as well as username information and session information). The VDR manager starts the Stealth service, and the event manager updates the state of that VDR to SESS_COI_ACTIVE (VDR active state 210). The authentication manager then passes a status of authentication back to the mobile device, confirming successful authentication.

Figure 6A:
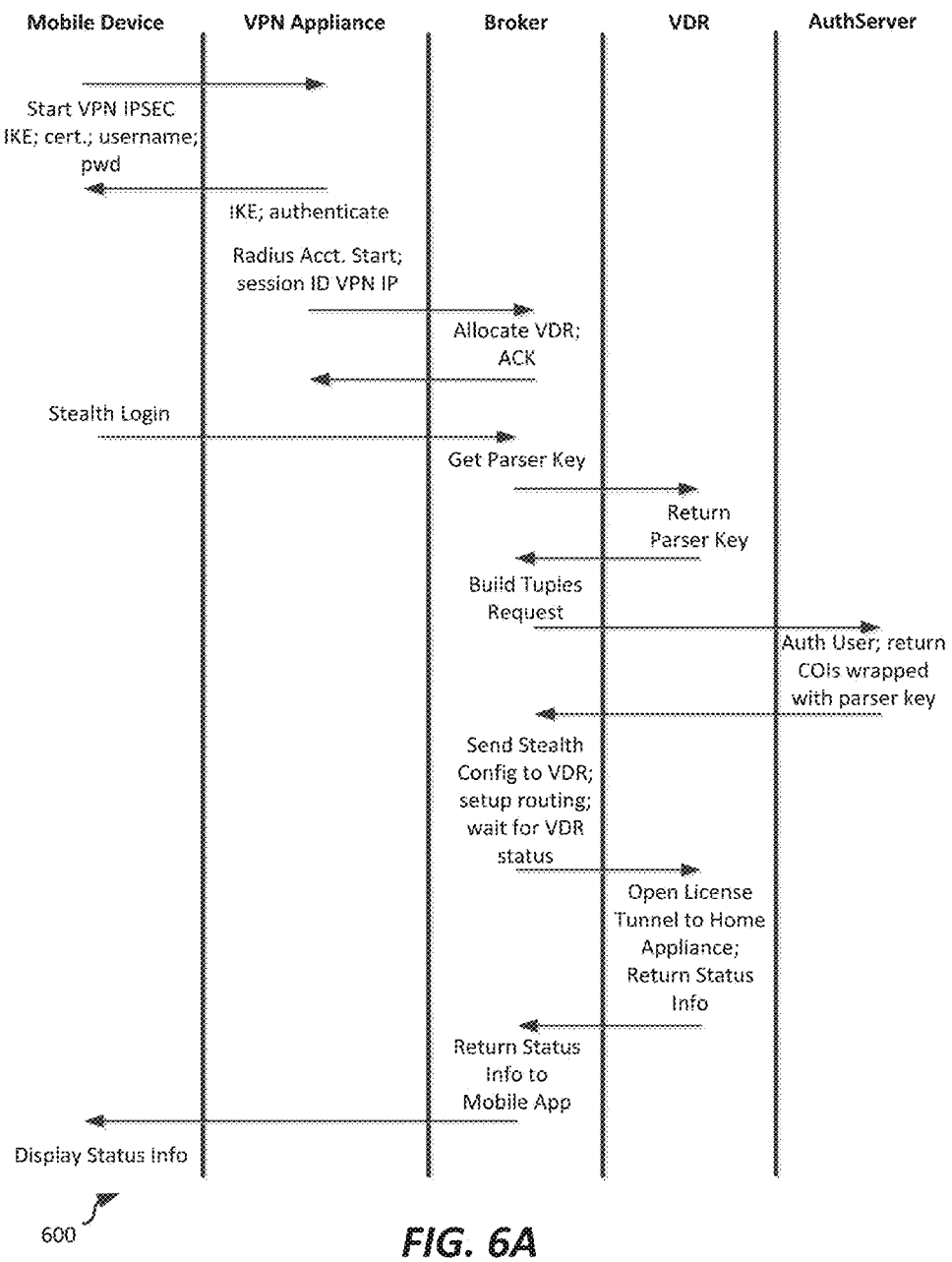
FIGS. 6A-6B illustrate a sequence of communications among devices in establishing communications between a mobile device and one or more secure endpoints within a secured network, according to an example embodiment.
Figure 6B:
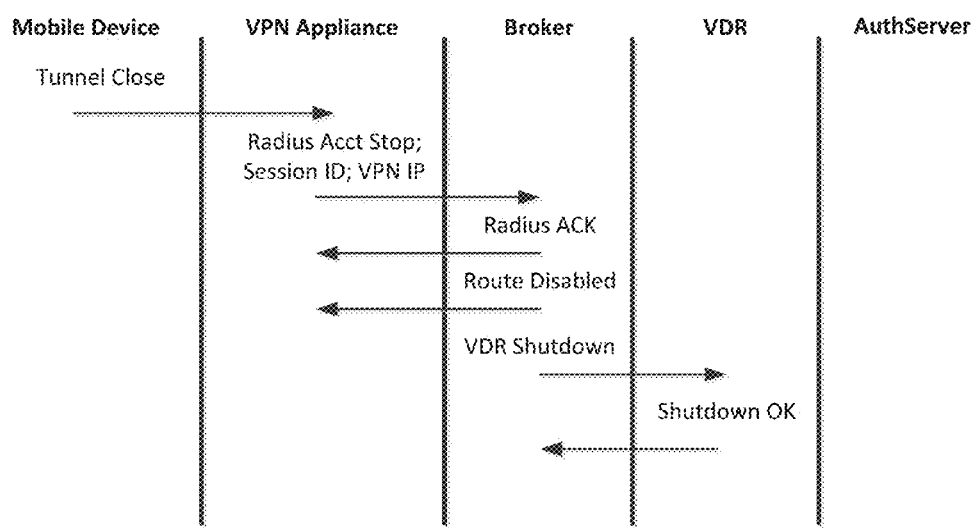

FIGS. 6A-6B illustrate a sequence of communications 600 among devices in establishing communications between a mobile device and one or more secure endpoints within a secured network, according to an example embodiment. The sequence of communication 600 can occur among a mobile device (e.g., mobile device 102), a VPN appliance (e.g., VPN server 104), a VDR broker (e.g., VDR broker 112 at mobile gateway 106), a VDR (e.g., VDR 114), and an authentication server (e.g., authentication server 134).

In the embodiment shown, a mobile device starts a secure application and provides a certificate, username, and password to the VPN appliance. The VPN appliance authenticates the mobile device and establishes a secure (e.g., IPsec-based tunneled) connection between the mobile device and VPN appliance. The VPN appliance transmits a session ID and VPN IP address to the VDR broker, which allocates a VDR and sends an acknowledgement back to the VPN appliance. The mobile device then transmits a login request to the VDR broker, which obtains a wrapping key from an allocated VDR and builds a tuples request. The VDR broker transmits the tuples request to the authentication server, which includes the wrapping key and the user's login credentials. The authentication server authenticates the user based on the login credentials, and returns that user's COI keys wrapped with the VDR wrapping key to the VDR broker as a tuples XML response. The VDR broker sends a Stealth configuration to the VDR, which opens a license tunnel to a home appliance, and returns status information to the VDR broker. The VDR broker in turn optionally returns the status information to the mobile device for confirmation.

As seen in FIG. 6B, the established tunnel can be closed by the mobile device transmitting a tunnel close message to the VPN appliance, which stops the VPN connection and transmits a stop message, alongside a session ID and the VPN IP address, to the VDR broker. Based on that information, the broker updates and deallocates the VDR, and confirms with the VPN appliance. A VDR shutdown messages is transmitted to the VDR associated with the VPN IP address and session ID, and the VDR returns a shutdown confirmation message upon shutdown to the VDR broker.

Figure 7:
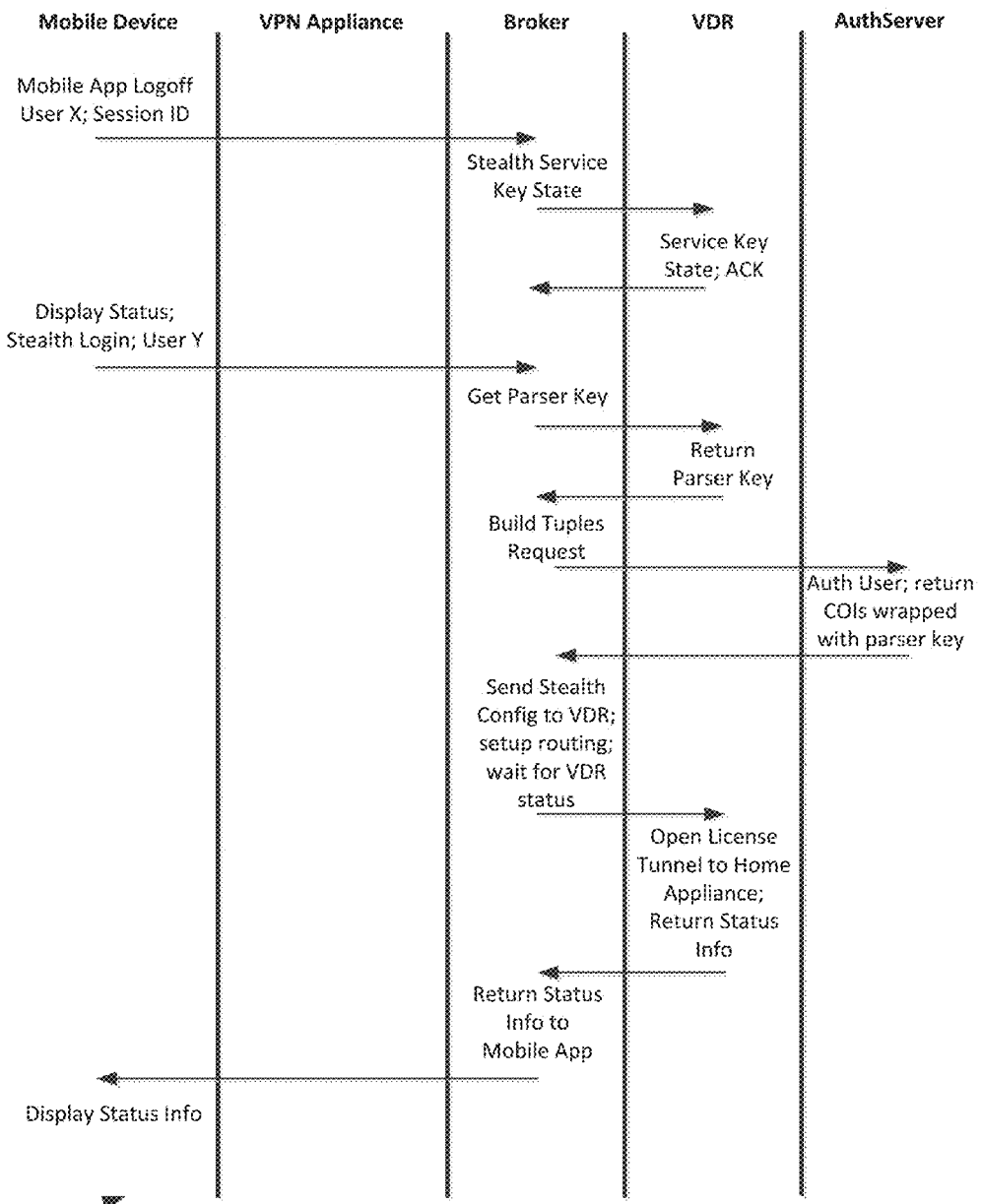
FIG. 7 illustrates a sequence of communications among devices in performing a logoff operation for a first user, and establishing communications between a mobile device and one or more secure endpoints within a secured network for a second user, according to an ex ample embodiment.

FIG. 7 illustrate a sequence of communications 700 among devices in performing a logoff operation for a first user, and establishing communications between a mobile device and one or more secure endpoints within a secured network for a second user, according to an example embodiment. The sequence of communications 700 as shown generally occurs among the same devices, or types of devices, as discussed above in connection with FIGS. 6A-6B.

In the embodiment shown, the mobile device transmits a logoff message associated with a first user and session (shown as User X and Session ID). The VDR broker transmits a stealth service key state message to the VDR, which returns an acknowledgement and the service key state to the VDR broker. A subsequent login message from the mobile device, associated with a different user (User Y) is received at the VDR broker, which obtains the wrapping key from the VDR, and builds a tuples request. As in FIGS. 6A-6B, the VDR broker retrieves COI information associated with the user (in this case User Y) retrieved from the authentication server wrapped in the wrapping key. The VDR broker then configures the VDR, which opens a license tunnel and initiates communication. The VDR broker transmits an updated status indicating successful connection to the mobile device, which optionally displays status information indicating successful connection.

Figure 8:
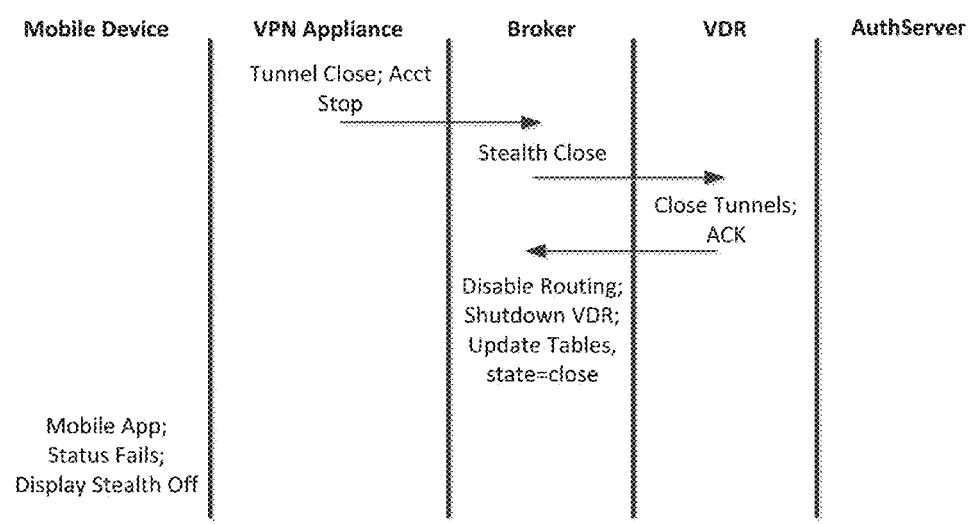
FIG. 8 illustrates a sequence of communications among devices in performing a connection process in which a VPN error occurs, according to an example embodiment.
Figure 9:
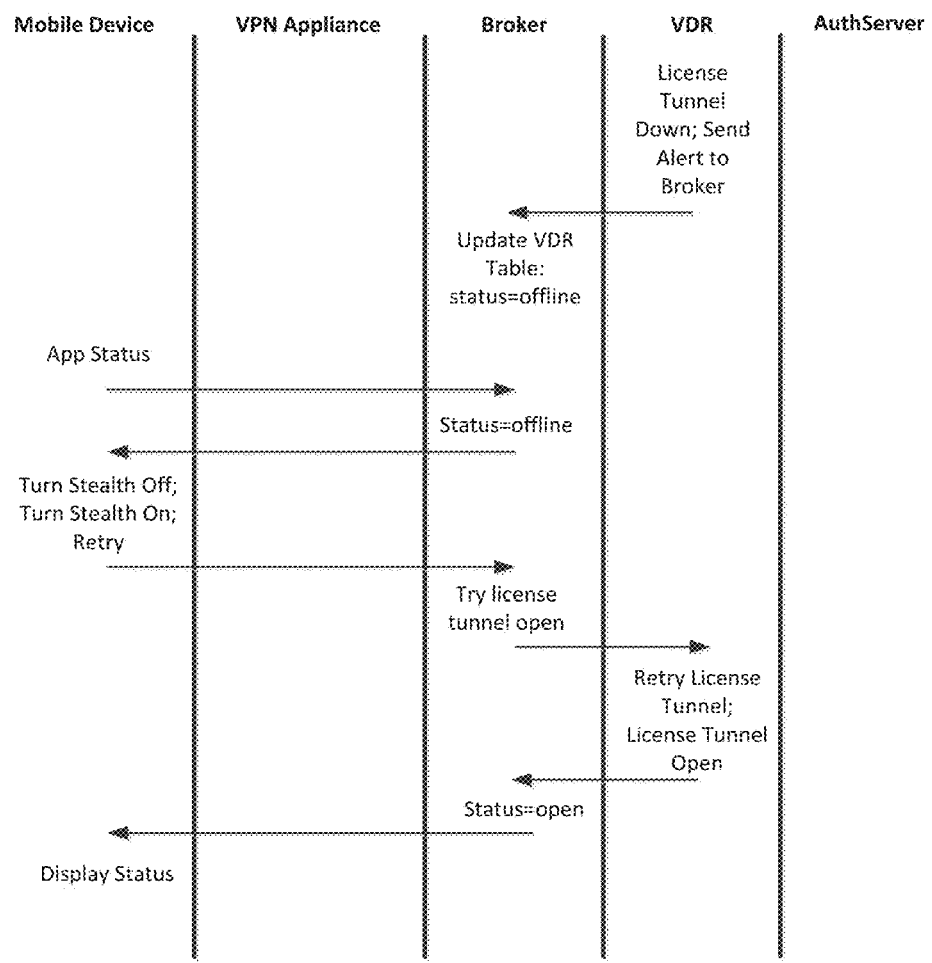
FIG. 9 illustrates a sequence of communications among devices in performing a connection process in which a Stealth tunnel error occurs and is closed, according to an example embodiment.

Referring now to FIGS. 8-9, example connection sequences are illustrated depicting failed connections. FIG. 8 illustrates a sequence of communications 800 among devices in performing a connection process in which a VPN error occurs, according to an example embodiment. In this embodiment, upon occurrence of a VPN error, the VPN appliance will close a VPN tunnel and indicate to the VDR broker that the tunnel has closed. The VDR broker will close the Stealth connection and transmit a message to the VDR associated with the mobile device to close all tunnels. The VDR will return an acknowledgement to the VDR broker, which disables routing, shuts down the VDR, and updates its state tables. The mobile device, which has an application status connection, will identify the failed VPN connection and display an indication of failed connectivity.

Similarly to FIG. 8, FIG. 9 illustrates a sequence of communications among devices in performing a connection process in which a Stealth tunnel error occurs and is closed, according to an example embodiment. In this sequence of communications 900, because it is the Stealth connection which fails (e.g., due to dropping a license tunnel), the VDR transmits a notification to the VDR broker, which updates the VDR table 131, setting a status to offline. The mobile device will request an application status from the VDR broker, and, upon finding that a status of the VDR is "offline", will turn off Stealth and turn it back on, attempting reconnection. The VDR broker will try to reopen the license tunnel, and, upon successful reopening of the license tunnel from the VDR, the VDR broker will update status and return that status to the mobile device for display.

Figure 10:
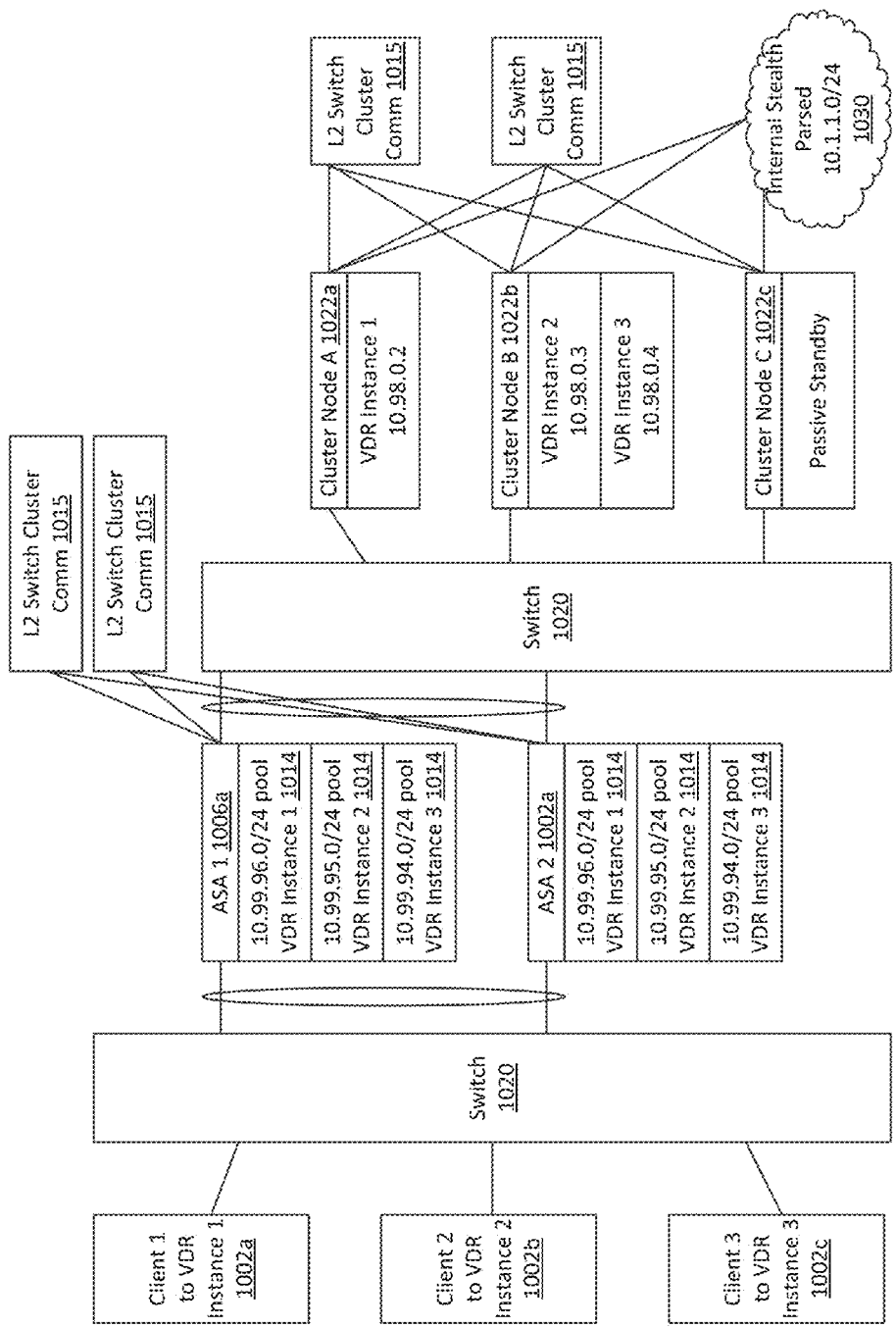
FIG. 10 illustrates an arrangement of the network of FIG. 1 according to a further example embodiment providing high-availability connection for mobile devices to a Stealth-enabled network.

Referring now to FIG. 10, an arrangement 1000 of the network of FIG. 1 according to a further example embodiment providing high-availability connection for mobile devices to a Stealth-enabled network is shown. The arrangement 1000 ensures availability of a VDR by establishing redundant mobile gateways, in the embodiment shown, three client device connections 1002a-c are shown, connecting to two different mobile gateways 1006 (via VPN appliances, not shown). In this instance, VDR instances 1014 are redundant across the gateways and pooled between switches 1020, allowing for shared usage of VDRs across the mobile gateways. Accordingly, the client device connections 1002a-c can be made to either mobile gateway, with an L2 switch cluster communication module 1015 managing communication therebetween. Within a Stealth-enabled network 1030 (connected by switch 1020), cluster nodes 1022a-c are provided in which additional VDR instances are provided at cluster nodes, and are connected in a redundant, star-configuration to the Stealth-enabled network.

Figure 11:
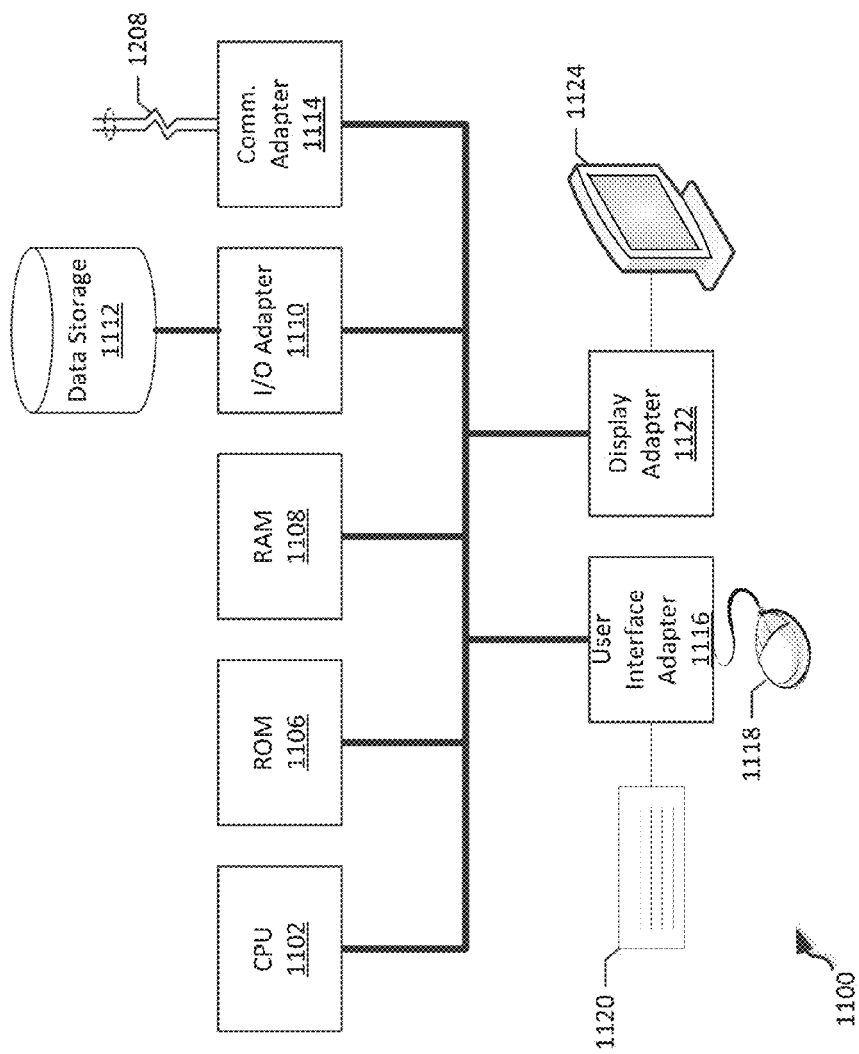
FIG. 11 illustrates an example computing system in which aspects of the present disclosure can be implemented.
Figure 12:
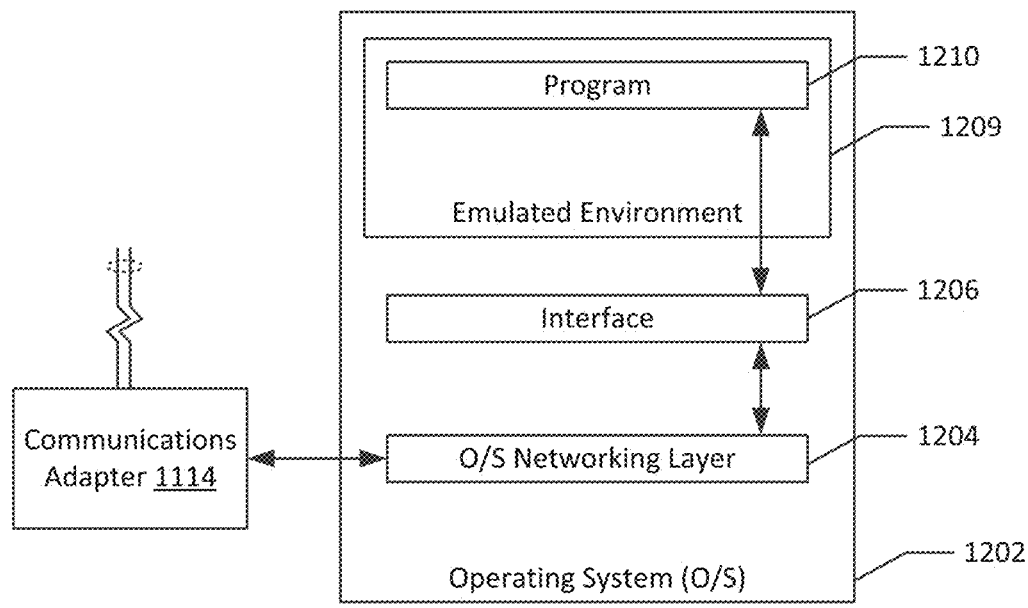
FIG. 12 illustrates an example virtualization environment implemented on a computing system, illustrating a mechanism by which private-domain and cloud-based virtual machines can be implemented.
Figure 13:
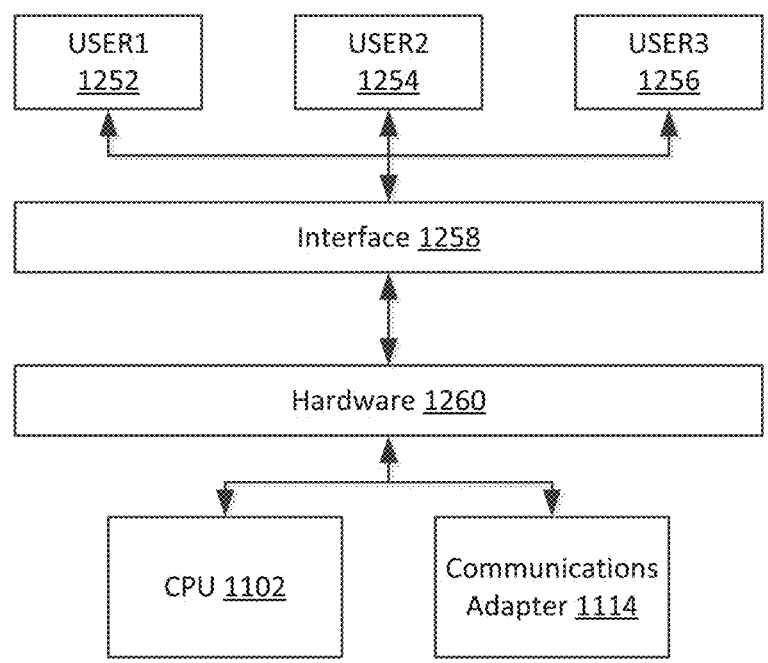
FIG. 13 illustrates an example multi-user computing arrangement illustrating shared computing resources across different partitions and/or virtual machines, according to example embodiments.

Referring to FIGS. 11-13, example details regarding computing systems in which aspects of the present disclosure can be implemented are provided. Such computing systems represent optional emulated environments in which the methods and systems of the present disclosure can be implemented, for example using the hardware systems disclosed above in connection with FIGS. 1, 3, and 10.

FIG. 11 illustrates a computer system 1100 adapted according to certain embodiments of the gateway computing device, server and/or the user interface device. The central processing unit ("CPU") 1102 is coupled to the system bus 1104. The CPU 1102 may be a general purpose CPU or microprocessor, graphics processing unit ("GPU"), and/or microcontroller. The present embodiments are not restricted by the architecture of the CPU 1102 so long as the CPU 1102, whether directly or indirectly, supports the operations as described herein. The CPU 1102 may execute the various logical instructions according to the present embodiments.

The computer system 1100 also may include random access memory (RAM) 1108, which may be synchronous RAM (SRAM), dynamic RAM (DRAM), synchronous dynamic RAM (SDRAM), or the like. The computer system 1100 may utilize RAM 1108 to store the various data structures used by a software application. The computer system 1100 may also include read only memory (ROM) 1106 which may be PROM, EPROM, EEPROM, optical storage, or the like. The ROM may store configuration information for booting the computer system 1100. The RAM 1108 and the ROM 1106 hold user and system data, and both the RAM 1108 and the ROM 1106 may be randomly accessed.

The computer system 1100 may also include an input/output (I/O) adapter 1110, a communications adapter 1114, a user interface adapter 1116, and a display adapter 1122. The I/O adapter 1110 and/or the user interface adapter 1116 may, in certain embodiments, enable a user to interact with the computer system 1100. In a further embodiment, the display adapter 1122 may display a graphical user interface (GUI) associated with a software or web-based application on a display device 1124, such as a monitor or touch screen.

The I/O adapter 1110 may couple one or more storage devices 1112, such as one or more of a hard drive, a solid state storage device, a flash drive, a compact disc (CD) drive, a floppy disk drive, and a tape drive, to the computer system 1100. According to one embodiment, the storage device 1112 may be a separate server coupled to the computer system 1100 through a network connection to the I/O adapter 1110. The communications adapter 1114 may be adapted to couple the computer system 1100 to the network 1208, which may be one or more of a LAN, WAN, and/or the Internet. The communications adapter 1114 may also be adapted to couple the computer system 1100 to other networks such as a global positioning system (GPS) or a Bluetooth network. The user interface adapter 1116 couples user input devices, such as a keyboard 1120, a pointing device 1118, and/or a touch screen (not shown) to the computer system 1100. The keyboard 1120 may be an on-screen keyboard displayed on a touch panel. Additional devices (not shown) such as a camera, microphone, video camera, accelerometer, compass, and or gyroscope may be coupled to the user interface adapter 1116. The display adapter 1122 may be driven by the CPU 1102 to control the display on the display device 1124. Any of the devices 1102-1122 may be physical and/or logical.

The applications of the present disclosure are not limited to the architecture of computer system 1100. Rather the computer system 1100 is provided as an example of one type of computing device that may be adapted to perform the functions of a server and/or a user interface/client device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 1100 may be virtualized for access by multiple users and/or applications.

FIG. 12 is a block diagram illustrating a server hosting an emulated software environment for virtualization according to one embodiment of the disclosure. An operating system 1202 executing on a server includes drivers for accessing hardware components, such as a networking layer 1204 for accessing the communications adapter 1114. The operating system 1202 may be, for example, Linux. An emulated environment 1209 in the operating system 1202 executes a program 1210, such as CPCommOS. The program 1210 accesses the networking layer 1204 of the operating system 1202 through a non-emulated interface 1206, such as XNIOP. The non-emulated interface 1206 translates requests from the program 1210 executing in the emulated environment 1209 for the networking layer 1204 of the operating system 1202.

In another example, hardware in a computer system may be virtualized through a hypervisor. FIG. 13 is a block diagram illustrating a server hosting an emulated hardware environment according to one embodiment of the disclosure. Users 1252, 1254, 1256 may access the hardware 1260 through a hypervisor 1258. The hypervisor 1258 may be integrated with the hardware 1260 to provide virtualization of the hardware 1260 without an operating system, such as in the configuration illustrated in FIG. 11. The hypervisor 1258 may provide access to the hardware 1260, including the CPU 1102 and the communications adapter 1114.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of flatter, means, methods, or steps.

Referring to FIGS. 1-13 overall, it is noted that in addition to the above functionality, it is apparent that specific applications may be made available using the methods and systems discussed herein for providing mobile connectivity to a Stealth-enabled network. For example, application-level connectivity and security can be provided, allowing for different access by different applications to different endpoints within different communities of interest, with dedicated VDRs for each community of interest and/or application connection made. Furthermore, based on the flexibility of communication connections of mobile devices, VDRs can be dynamically allocated, either at a particular mobile gateway or within a high availability environment including redundant and fault-tolerant networks of mobile gateways. Other advantages are provided as well, as are apparent from the above disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of communicating with secure endpoints included within a secured network from a mobile device external to the secured network, the method comprising:
    initiating a virtual private network (VPN) based secure connection to a VPN appliance;
    initializing a stealth-based service on the mobile device;
    transmitting user credential information from the mobile device to a virtual data relay (VDR) broker via the VPN appliance;
    receiving status information from the VDR broker identifying a VDR associated with the mobile device and providing a connected status; and
    communicating with one or more secure endpoints within the secured network via a VPN connection to the VDR via the VPN appliance and through the VDR to the one or more secure endpoints within a community of interest based on user credential information transmitted to the VDR broker.

2. The method of claim 1, wherein the community of interest includes a user of the mobile device and the one or more secure endpoints but excludes one or more second endpoints within the secured network, wherein the one or more second endpoints are obscured to the user of the mobile device while the mobile device has the connected status.

3. The method of claim 1, wherein the mobile device includes a mobile security application installed thereon.

4. The method of claim 1, wherein the mobile device includes a first application and a second application installed thereon, and wherein the user credential information is collected by the first application.

5. The method of claim 4, wherein communicating with one or more secure endpoints comprises initiating communication from the first application, wherein the second application is excluded from the community of interest and lacks access to the one or more secure endpoints.

6. The method of claim 4, further comprising:
transmitting second user credential information from the second application on the mobile device to the VDR broker;
receiving status information from the VDR broker identifying a second VDR associated with the mobile device and providing the connected status; and
communicating with one or more second secure endpoints within the secured network via a VPN connection to the second VDR via the VPN appliance and through the second VDR to the one or more second secure endpoints within a second community of interest based on the second user credential information.

7. The method of claim 1, further comprising transmitting a tunnel close command to the VDR broker via the VPN appliance.

8. The method of claim 7, wherein transmission of the tunnel close command causes the VPN appliance to close a VPN tunnel and causes the VDR broker to shut down the VDR associated with the mobile device.

9. A system for enabling communication between a mobile device and one or more secure endpoints included within a secured network, the system comprising:
a mobile gateway communicatively connectable to the mobile device via a tunneled connection, configured to manage a plurality of a virtual data recorder (VDR) connectivity states for each VDR connection, the plurality of VDR connectivity states including:
an inactive state;
a request VDR state;
an assigned VDR state;
a provisioning request state; and
a community of interest (COI) active state;
the mobile gateway including:
a processor operating as a VDR broker and configured to allocate VDRs to mobile devices based on authentication credentials received from the mobile devices and obtain key information to provide to the allocated VDRs for use in secure communications within the secured network;
one or more VDRs associated with the mobile device and providing proxied secure communications using the key information obtained from an authentication server based on the authentication credentials provided by the mobile device.

10. The system of claim 9, further comprising the mobile device, wherein the mobile device includes a Stealth connectivity application installed thereon.

11. The system of claim 10, further comprising a VPN appliance connected between the mobile device and the mobile gateway.

12. The system of claim 9, further comprising the authentication server, wherein the authentication server is within the secured network communicatively connected to the mobile gateway.

13. The system of claim 9, further comprising a licensing VDR at the mobile gateway configured to maintain a licensing tunnel to a licensing server within the secured network, wherein, upon failure of the licensing tunnel, each of the VDRs allocated at the mobile gateway are interrupted.

14. The system of claim 9, wherein the key information is associated with a community of interest of which the mobile device is a member based on the received authentication credentials.

* * * * *